(12) United States Patent
Ohyama

(10) Patent No.: US 7,962,965 B2
(45) Date of Patent: Jun. 14, 2011

(54) SEMICONDUCTOR DEVICE HAVING POWER CONSUMPTION ANALYSIS PREVENTING FUNCTION

(75) Inventor: Shigeo Ohyama, Nara (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 824 days.

(21) Appl. No.: 11/587,134

(22) PCT Filed: May 9, 2005

(86) PCT No.: PCT/JP2005/008420
§ 371 (c)(1),
(2), (4) Date: Jun. 22, 2007

(87) PCT Pub. No.: WO2005/109210
PCT Pub. Date: Nov. 17, 2005

(65) Prior Publication Data
US 2008/0141340 A1     Jun. 12, 2008

(30) Foreign Application Priority Data

May 10, 2004   (JP) ................................ 2004-139398

(51) Int. Cl.
*G08B 13/00* (2006.01)
*G08B 21/00* (2006.01)
*G08B 29/00* (2006.01)
*G06F 1/00* (2006.01)
*G01R 31/28* (2006.01)
*H03M 13/00* (2006.01)
*H04L 9/00* (2006.01)

(52) U.S. Cl. .............. 726/36; 726/34; 726/35; 713/300; 714/724; 714/777; 380/265

(58) Field of Classification Search .............. 726/34–35, 726/36; 714/724
See application file for complete search history.

(56) References Cited

U.S. PATENT DOCUMENTS

| 4,932,053 | A | | 6/1990 | Fruhauf et al. | |
|---|---|---|---|---|---|
| 5,093,830 | A | * | 3/1992 | Munter | 370/476 |

(Continued)

FOREIGN PATENT DOCUMENTS

| JP | 2-199561 A | 8/1990 |
|---|---|---|
| JP | 2001-5731 A | 1/2001 |
| JP | 2003-526134 A | 9/2003 |

(Continued)

*Primary Examiner* — Taghi T Arani
*Assistant Examiner* — Morshed Mehedi
(74) *Attorney, Agent, or Firm* — Birch, Stewart, Kolasch & Birch, LLP

(57) ABSTRACT

There is a provided a semiconductor device having a high security whose power consumption is difficult to analyze even without setting up random characteristic to the processing time. The semiconductor device includes a target circuit (14), a sub-target circuit (15) having the same circuit configuration as the target circuit (14), and a dummy bit string generation circuit (11) for generating a bit string of a dummy serial input signal to be inputted to the sub-target circuit (15) according to the bit string of the serial input signal of the target circuit (14). The dummy bit string generation circuit (11) includes a hamming distance detection circuit (12) for detecting a hamming distance between two continuous bits of the serial input signal as a first hamming distance, and a conflicting signal generation circuit (13) for generating after the last bit, upon detection of the first hamming distance, an input bit having a hamming distance from the last bit of the bit string of the dummy serial input signal which distance is a second hamming distance conflicting with the first hamming distance.

6 Claims, 7 Drawing Sheets

U.S. PATENT DOCUMENTS

| | | | |
|---|---|---|---|
| 5,416,786 A * | 5/1995 | Lin et al. | 714/782 |
| 6,498,404 B1 | 12/2002 | Thuringer et al. | |
| 6,571,361 B1 * | 5/2003 | Kikuchi et al. | 714/701 |
| 7,086,087 B1 | 8/2006 | Kaminaga et al. | |
| 7,127,616 B2 * | 10/2006 | Kaneko | 713/191 |
| 2002/0159599 A1 * | 10/2002 | Matsui et al. | 380/263 |
| 2003/0046636 A1 * | 3/2003 | Kanasugi et al. | 714/781 |
| 2003/0223580 A1 * | 12/2003 | Snell | 380/28 |
| 2006/0285424 A1 * | 12/2006 | Gregorius et al. | 365/233 |

FOREIGN PATENT DOCUMENTS

| | | |
|---|---|---|
| JP | 2003-337750 A | 11/2003 |
| JP | 2004-38318 A | 2/2004 |
| JP | 2004-40244 A | 2/2004 |
| WO | WO-00/39660 | 7/2000 |
| WO | WO-00/42484 | 7/2000 |
| WO | WO-02/056409 A1 | 7/2002 |
| WO | WO 2004015959 A2 * | 2/2004 |

* cited by examiner

SEMICONDUCTOR DEVICE HAVING POWER CONSUMPTION ANALYSIS PREVENTING FUNCTION

CROSS-REFERENCE TO RELATED APPLICATIONS

This application is a National Phase filing under 35 U.S.C. §371 of International Application No. PCT/JP2005/008420 filed on May 9, 2005, and which claims priority to Japanese Patent Application No. 2004-139398 filed on May 10, 2004.

TECHNICAL FIELD

The present invention relates to a security technique in a semiconductor device for protecting internal data from any attack of disclosing internal action of a semiconductor device through power consumption analysis.

BACKGROUND ART

Such a semiconductor device installed in an IC card is known that its security is high because its internal secret data is processed without being released to the outside. An attack of accessing and reading the internal data in the high security semiconductor device from the outside is commonly classified into destructive analysis and non-destructive analysis.

The destructive analysis is designed for physically modifying a semiconductor device to read out or rewrite its internal data. In the destructive analysis, information about a device for modifying and circuit of the semiconductor device to be examined is required, analysis takes a considerable length of time and a significant amount of cost and an attack hardly be implemented with success.

In contrast, the non-destructive analysis is intended for attacking its action without physically modifying the semiconductor device.

The non-destructive analysis is also substantially classified into Differential Fault Analysis (DFA), in which an error is induced and secret data are exposed by providing an terminal of a semiconductor device with noise or providing an operation environment of a semiconductor device with stress, Simple Power Analysis (SPA) and Differential Power Analysis (DPA), in both which secret data are exposed by analyzing a power consumption of a semiconductor device, examining an internal action and then estimating the internal action. While, the attack by DFA is possibly inhibited using sensors which monitor the outside environment, the attack by the power consumption analysis can hardly be monitored by the semiconductor device. Accordingly, any type of the semiconductor device having no counter measure against the power consumption analysis is disadvantageous on its security.

There is a technique for providing the action clock at random for the security concerns in the power consumption analysis (See Patent Citation 1). Patent Citation 1 employs a pseudo random number sequence as the clock for a sub module in the internal circuit. This permits processing time and power consumption for the same process in the sub module to be varied at each action, and thus the power consumption analysis becomes difficult.

FIG. 7 is a block diagram showing a circuit used by the technique disclosed in Patent Citation 1. Patent Citation 1 discloses a semiconductor device 100 which comprises an input clock signal 110 and a pair of clock converting circuits 101 and 121 for converting and outputting the input clock signal, where the input clock signal 110 is converted by the action of the clock converting circuits 101 and 121 into clock signals of pseudo random number sequence which are used by sub modules in modules 108 and 109. Accordingly, the power consumption appears at random regardless of the internal processing of the circuit and thus the power consumption analysis becomes difficult.

[Patent Citation 1]: Japanese Patent Laid-open Publication No. 2003-337750.

DISCLOSURE OF INVENTION

Problem to be Solved by the Invention

However, the technique disclosed in Patent Citation 1 fails to synchronize the action between the two modules 108 and 109 when one of the two modules is varied every time in the processing time. As the result, exchange of signals between the two modules is performed at random, and thus the circuit action of the entire system becomes unstable. In order to ensure a normal action of the entire system, the maximum processing time needs to be consistently considered for the random action time. Consequently, the processing performance is declining.

The present invention has been developed in view of the above aspect and its object is to provide a semiconductor device which is higher in the security without having the processing time at random but permitting the power consumption analysis to be unsuccessful.

Means for Solving the Problem

For achievement of the above object, a semiconductor device according to the present invention comprises, as a first feature, a target circuit, a sub-target circuit having the same circuit configuration as the target circuit, and a dummy bit string generation circuit for generating a bit string of a dummy serial input signal which is received into the sub-target circuit based on a bit string of the serial input signal received into the target circuit, in which the dummy bit string generation circuit is arranged to generate a bit string of the dummy serial input signal so that the sum of the number of bit shift times in the serial input signal and the number of bit shift times in the dummy serial input signal remains constant or substantially constant in a series of a plurality of clock cycles.

The prevent invention of the first feature allows the sub-target circuit having the same circuit configuration as the target circuit to be varied in the internal state in response to a shift in the input signal, and thus the power consumption increases in proportion to the number of bit shift times in the input signal. Also, since the sum of the number of bit shift times in the serial input signal and the number of bit shift times in the dummy serial input signal remains constant or substantially constant in a series of a plurality of clock cycles, the sum of the power consumption of the target circuit and the sub-target circuit appears constant or substantially constant. As the result, the power consumption of the semiconductor device remains uniform regardless of input patterns of the serial input signal and thus the power consumption analysis from the outside can be prevented.

For achievement of the object, a semiconductor device according to the present invention comprises, as a second feature, a target circuit, a sub-target circuit having the same circuit configuration as the target circuit, and a dummy bit string generation circuit for generating a bit string of the dummy serial input signal received into the sub-target circuit based on a bit string of the serial input signal received into the target circuit, in which the dummy bit string generation circuit comprises a hamming distance detection circuit for detecting the hamming distance between two consecutive bits of the serial input signal as the first hamming distance, and a conflicting signal generation circuit for generating an input bit which follows the last bit of the bit string of the dummy serial input signal during a detection of the first hamming distance so that a second hamming distance between the input bit and the last bit conflicts with the first hamming distance.

The prevent invention of the second feature allows the dummy serial input signal received into the sub-target circuit to have no bit shift when the serial input signal received into the target circuit produces a bit shift or have a bit shift when the serial input signal produces no bit shift, whereby the sum of the number of bit shift times in the serial input signal and the number of bit shift times in the dummy serial input signal can be constant or substantially constant in a series of a plurality of clock cycles. When the sum remains substantially constant, there is a difference of time between the generation of the dummy serial input signal and the detection of the first hamming distance in the serial input signal. Accordingly, since the same effect as of the first feature is ensured, the power consumption of the semiconductor device remains uniform regardless of input patterns of the serial input signal and thus the power consumption analysis from the outside can be prevented.

In addition to the second feature, the hamming distance detection circuit in the semiconductor device according to the present invention comprises shift registers and an exclusive OR circuit for detecting bit shift points in the bit string of the serial input signal. This provides a specific circuit for detecting the hamming distance between two consecutive bits of the serial input signal. Also, the conflicting signal generation circuit inverts the last bit of the bit string of the dummy serial input signal when the first hamming distance is zero, and it does not inverts the last bit when the first hamming distance is one. This allows the conflicting signal generation circuit to generate an input bit following the last bit in the bit string of the dummy serial input signal during the detection of the first hamming distance so that the second hamming distance between the input bit and the last bit conflicts with the first hamming distance.

In addition to the above features, the semiconductor device according to the present invention is characterized as the third feature in that a plurality of the serial input signals are provided for dispatching to the target circuit in parallel, the same number of the dummy bit string generation circuits as the number of the serial input signals are provided corresponding to each of the serial input signals, whereby each of the dummy bit string generation circuits receives separately the bit string in the corresponding serial input signal and generates a bit string of the dummy serial input signal which is received into the sub-target circuit.

The prevent invention of the third feature allows each of the serial input signals received by the target circuit in parallel and its corresponding dummy serial input signal to be correlated with each other so that the sum of the number of bit shift times in the serial input signal and the number of bit shift times in the dummy serial input signal remains constant or substantially constant in a series of a plurality of clock cycles. Although a plurality of the serial input signals are received by the target circuit, each of the sub-target circuits having the same circuit configuration as the target circuit can be varied in the internal state depending on a change in each input signal, and thus the power consumption increases in proportion to the number of bit shift times in the input signal. Accordingly, since the same effect as of the first feature is ensured, the power consumption of the semiconductor device remains uniform regardless of the number of the serial input signals and patterns of the serial input signal and thus the power consumption analysis from the outside can be prevented.

A central processing unit according to the present invention is a central processing unit including an ALU, a register bank, a command fetch circuit, and micro-code decoders, and comprises the target circuit, the sub-target circuit, and the dummy bit string generation circuit in the semiconductor device of any of the features according to the present invention, in which the target circuit and the sub-target circuit are the micro-code decoders respectively. In addition, an IC card according to the present invention incorporates the central processing unit according to the present invention.

The central processing unit according to the present invention allows the sum of the power consumption between the micro-code decoders as the target circuit and the micro-code decoders as the sub-target circuit to be constant or substantially constant, and then the action of the central processing unit can be prevented from being revealed from the power consumption analysis. Moreover, the IC card according to the present invention can be higher in the security as improved in the protection from the power consumption analysis.

EXPLANATION OF REFERENCES

Figure 1:
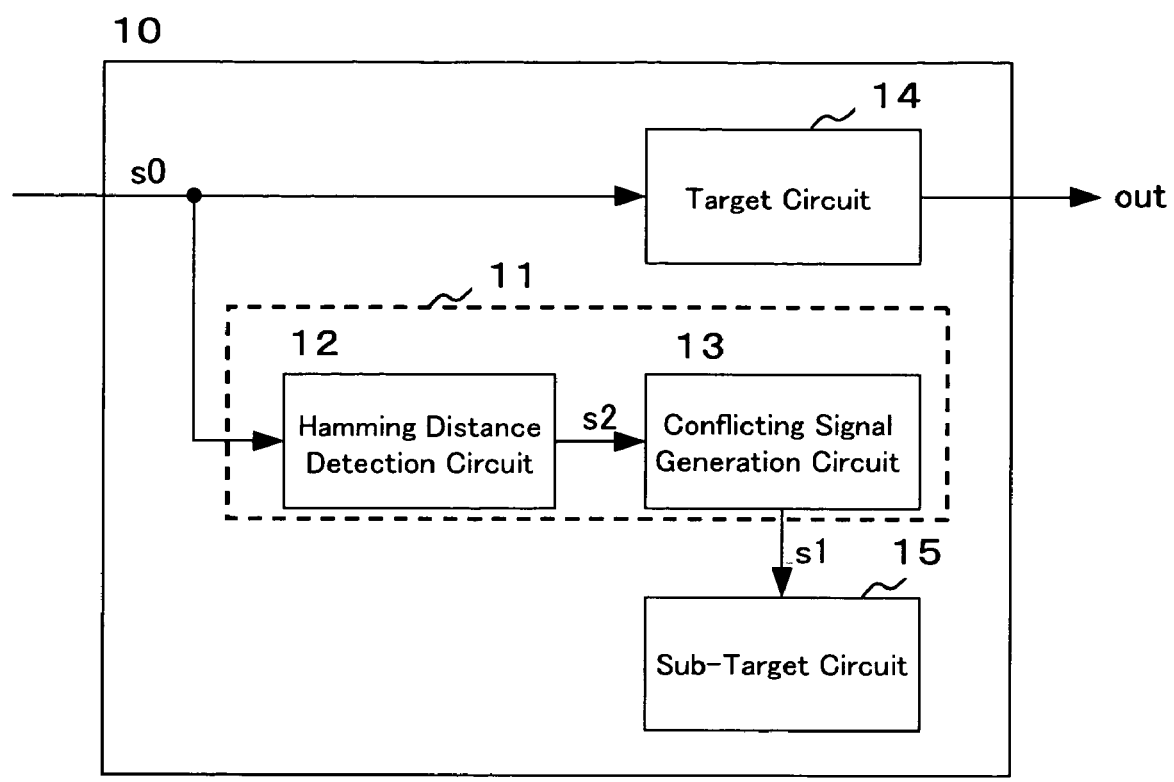
FIG. 1 is a block diagram showing a configuration example of a circuit block of a semiconductor device in which the power consumption analysis preventing function according to the first embodiment of the present invention is operable.

10: Circuit Block of a semiconductor device for performing the power consumption analysis preventing function according to the present invention
11: Dummy Bit String Generation circuit
12: Hamming Distance Detection circuit
13: Conflicting Signal Generation circuit
14: Target Circuit
15: Sub-target Circuit
121, 122: D Flip-flop (Shift Register)
123: Exclusive OR Circuit
131: Selector
132: Inverter
133: D Flip-flop (s1 Signal Register)
200: Power Consumption Analysis Preventing circuit
220: Micro-code Decoder
230: Sub Micro-code Decoder 240: Command Fetch Circuit
250: Register Bank
260: ALU
300: CPU
400: Peripheral Circuit
500: ROM
600: RAM
700: Nonvolatile Memory
800: Data Bus
900: IC Card

BEST MODE FOR CARRYING OUT THE
INVENTION

An embodiment of the present invention will be described in the form of a semiconductor device referring to the drawings.

First Embodiment

FIG. 1 shows a configuration example of a circuit block (referred to as an inventive circuit hereinafter) of the semiconductor device according to the present invention in which the power consumption analysis preventing function is operable.

The inventive circuit 10 comprises a dummy bit string generation circuit 11, a target circuit 14, and a sub-target circuit 15. The dummy bit string generation circuit 11 is arranged for generating a bit string S1 in the dummy serial input signal, which is received into the sub-target circuit 15 based on a bit string S0 in the serial input signal received into the target circuit 14 and comprises a hamming distance detection circuit 12 and a conflicting signal generation circuit 13. The target circuit 14 is arranged for conducting the actual processing actions while the circuit configuration of the sub-target circuit 15 is arranged identical to that of the target circuit 14 for preventing the analysis of the power consumption in the target circuit 14.

The hamming distance detection circuit 12 is provided for detecting the hamming distance, as a first hamming distance, between the bit s0 in the current clock period and the bit s0' in the one-clock advanced clock period using the bit string S0 of the serial input signal to be received into the target circuit 14 and releasing a detection signal s2 at the logic level corresponding to the first hamming distance (0 or 1). More particularly, the first hamming distance is measured at the timing of one clock delay which will be explained later in more detail.

The conflicting signal generation circuit 13 is arranged for generating an input bit s1 following the last bit s1' in the bit string S1 of the dummy serial input signal released one clock before, at the timing of input of the detection signal s2 in the current clock period, so that the second hamming distance between the input bit s1 and the last bit s1' conflicts with the first hamming distance. This action is timed with the clock period so that the bit string S1 in the dummy serial input signal is produced in a sequence before transferred to the sub-target circuit 15.

Figure 2:
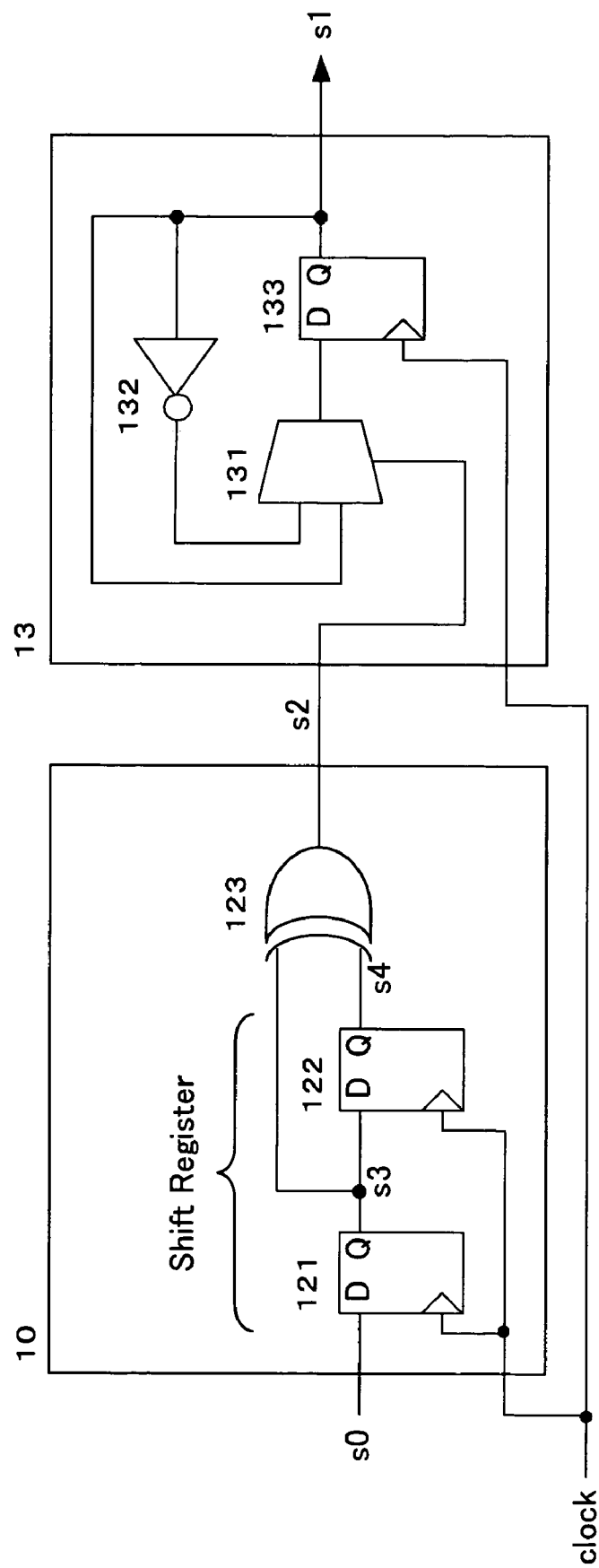
FIG. 2 is a circuitry block diagram showing a configuration example of a dummy bit string generation circuit in the block diagram of FIG. 1.

FIG. 2 illustrates specifically a circuit configuration example of the dummy bit string generation circuit 11. The hamming distance detection circuit 12 comprises a shift register composed of a D flip-flop 121 and a D flip-flop 122 and an exclusive OR circuit 123 for detecting a bit shift point in the bit string S0. This allows the hamming distance (the first hamming distance) between the input bit S3 advanced by one clock and the input bit S4 advanced by two clocks in the bit string S0 to be determined from the exclusive OR of the input bits S3 and S4, and thus generating the detection signal s2. More specifically, when a bit shift from 1 to 0 or from 0 to 1 occurs between any two consecutive bits in the bit string S0, the hamming distance between the two bits is 1 and the output of the exclusive OR circuit 123 is turned to the level of 1, whereby the bit shift point is measured in the bit string S0.

The conflicting signal generation circuit 13 comprises a selector 131, an inverter 132, and a D flip-flop 133. The selector 131 selects the output Q from the D flip-flop 133 when the logic level (the first hamming distance) is 1 or an inverse signal of the output Q from the D flip-flop 133 (the output of the inverter 132), either output being received into the D flip-flop 133.

Using the hamming distance detection circuit 12 and the conflicting signal generation circuit 13 shown in FIG. 2, the hamming distance between two consecutive bits can be determined from the detection signal s2 corresponding to the first hamming distance between two consecutive bits in the bit string S0 in the serial input signal thus to generate the bit string S1 in the dummy serial input signal of which the hamming distance between two consecutive bits is equal to the second hamming distance which conflicts with the first hamming distance.

Figure 3:
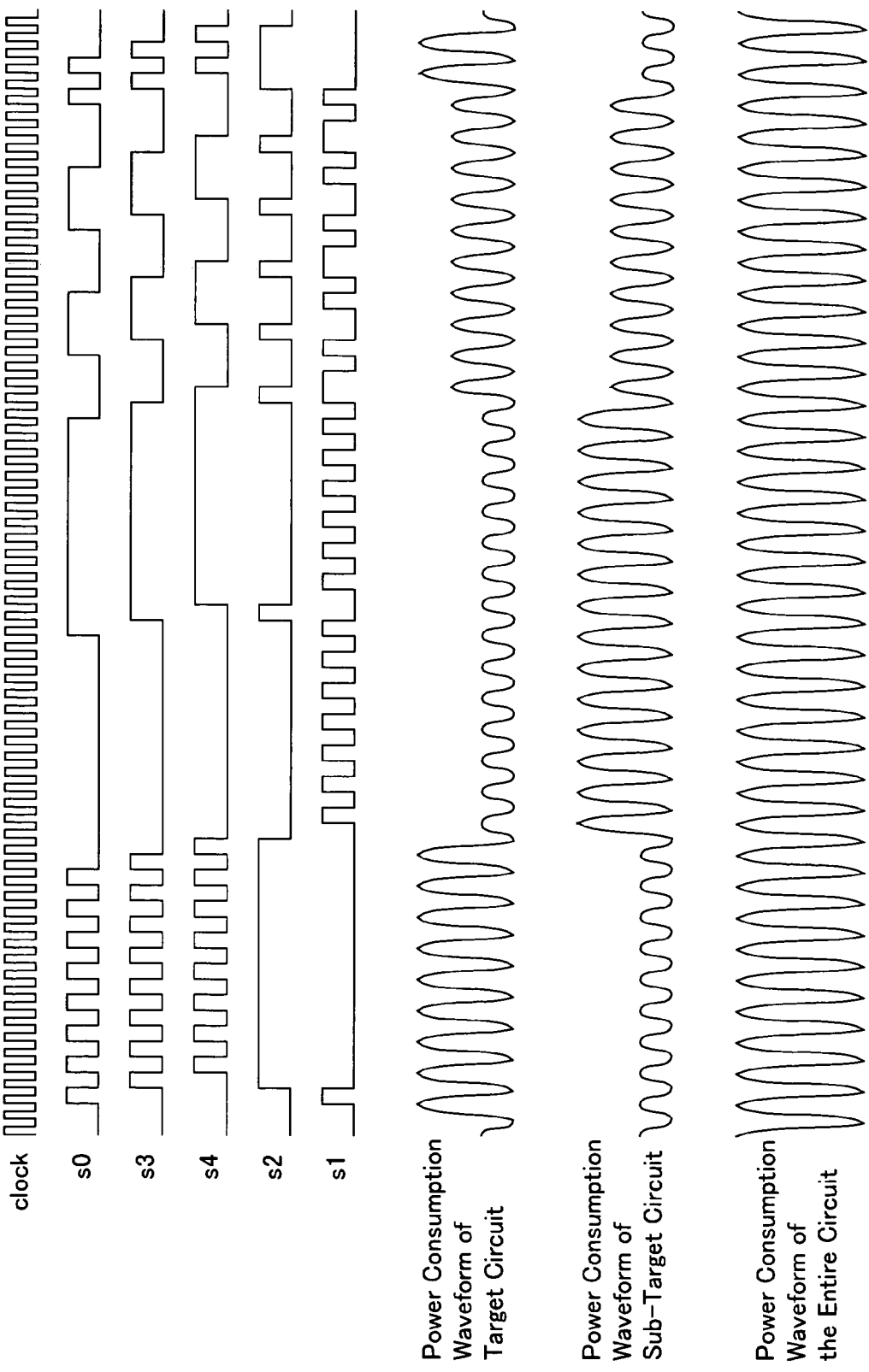
FIG. 3 is a timing waveform diagram and a power waveform diagram schematically showing waveforms of the timing signals s0 to s4 and the power consumption in the dummy bit string generation circuit in the block diagram of FIG. 1.

FIG. 3 illustrates waveforms of the signals s0 to s4 shown in FIGS. 1 and 2. The signals s3 and s4 are shifted by one bit and by two bits respectively from the bit string s0 of the serial input signal. The detection signal s2 is an exclusive OR signal from the two signals s3 and s4, exhibiting the first hamming distance. When the bit shift occurs in the bit string S0 of the serial input signal, the detection signal s2 turns to 1 after one clock. After another one clock, when the bit shift does not occur in the bit string S1 of the dummy serial input signal and in the bit string S0 of the serial input signal, the detection signal s2 turns to 0 after one clock. This is followed after another one clock by the bit shift occurs in the bit string s1 of the dummy serial input signal. Accordingly as shown in FIG. 3, as the sum of the bit shift times in the serial input signal and the bit shift times in the dummy serial input signal remains substantially constant in a series of a plurality of clock cycles, the sum of the power consumption of the target circuit and the power consumption of the sub-target circuit is substantially constant in the cycles. Since the waveform of the entire power consumption in the inventive circuit 10 remains uniform, the power consumption analysis becomes difficult.

It would be understood that the dummy bit string generation circuit 11 is not limited to the circuit configuration shown in FIG. 2. The dummy bit string generation circuit 11 may be implemented by any applicable circuit configuration, provided that a bit string in the dummy serial input signal is so produced that the sum of the bit shift times in the serial input signal and the dummy serial input signal in a series of a plurality of clock cycles remains constant or substantially constant.

Second Embodiment

Figure 4:
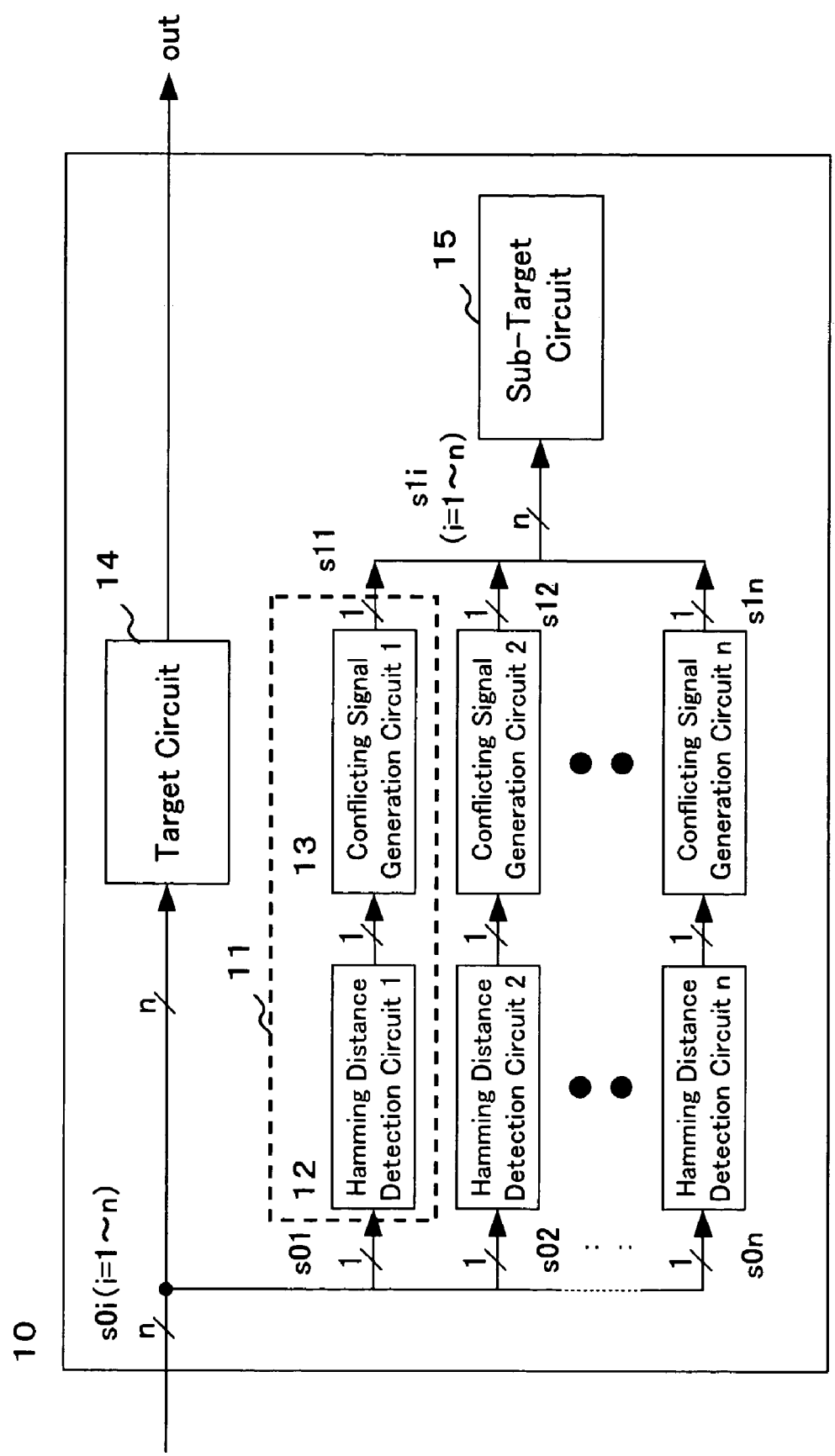
FIG. 4 is a block diagram showing a configuration example of a circuit block of a semiconductor device in which the power consumption analysis preventing function according to the second embodiment of the present invention is operable.

FIG. 4 illustrates a configuration example of the inventive circuit 10 according to the second embodiment of the present invention. The inventive circuit 10 of the second embodiment allows the target circuit 14 to receive a plurality of serial input signals S0$i$ ($i=1$ to n) in parallel and thus includes the same number (n) of dummy bit string generation circuits 11 as of the serial input signals. The i-th serial input signal S0$i$ is received into a hamming distance detection circuit 12 in the i-th dummy bit string generation circuit 11, and the conflicting signal generation circuit 13 in the i-th dummy bit string generation circuit 11 generates an i-th dummy serial input signal S1$i$. The dummy serial input signals S1$i$ (i=1 to n) released from their respective conflicting signal generation circuits 13 are transferred to the sub-target circuit 15 in parallel.

The circuit configuration of the dummy bit string generation circuits 11 are identical to that of the first embodiment shown in FIG. 2 and will be explained in no more detail. The actions of the dummy bit string generation circuits 11 are independent from each other and responsive simply to the input bit strings s0$i$ in the serial input signals S0$i$ to be received.

Third Embodiment

Another embodiment of the present invention will now be described where its semiconductor device is provided as a central processing unit (CPU).

Figure 5:
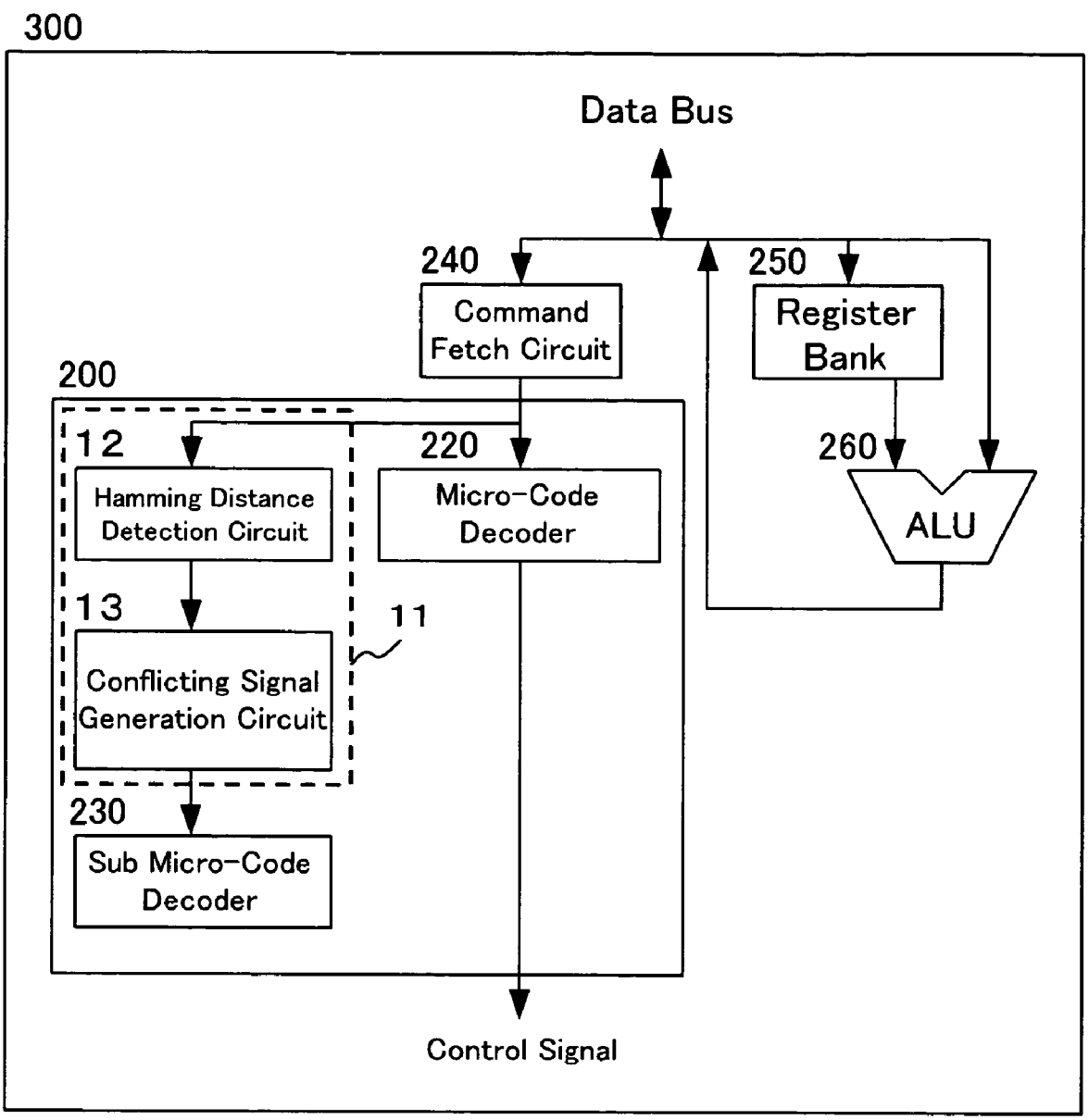
FIG. 5 is a block diagram of a system configuration of a central processing unit according to an embodiment of the present invention.

FIG. 5 illustrates a configuration example of the CPU of this embodiment of the present invention. A CPU 300 comprises a power consumption analysis preventing circuit 200 having a micro-code decoder 220, a command fetch circuit 240 for reading commands from an external memory and storing the commands therein, a register bank 250 provided as a generic register, and an ALU 260 for conducting arithmetic operations including addition. The CPU 300 is not limited to the circuit configuration shown in FIG. 5 but may be implemented in various modifications.

The CPU 300 is arranged for operating through translating the commands received from an external memory. The action of the micro-code decoder 220 for translating the commands represents the action of the CPU 300. Since the micro-code decoder 220 is a target circuit which is accessed by the power consumption analysis, it should be protected with the counter measure of the power consumption analysis for preventing the action of the CPU 300 from being revealed.

The power consumption analysis preventing circuit 200 is equivalent to the inventive circuit 10 of the first or second embodiment and thus comprises the dummy bit string generation circuit 11 composed of the hamming distance detection circuit 12 and the conflicting signal generation circuit 13, the micro-code decoder 220, and a sub micro-code decoder 230. The micro-code decoder 220 and the sub micro-code decoder 230 are equivalent to the target circuit 14 and the sub-target circuit 15 respectively in the first or second embodiment.

The hamming distance detection circuit 12 and the conflicting signal generation circuit 13 are also identical to those of the first embodiment and have fundamentally the same functions. More specifically, the hamming distance detection circuit 12 examines whether or not the serial input signal transferred from the command fetch circuit 240 to the micro-code decoder 220 contains a bit shift. As the result, the detection signal is dispatched to the conflicting signal generation circuit 13 which allows the first hamming distance to be at one when a bit shift is found or at zero when a bit shift is not found. In turn, the conflicting signal generation circuit 13 produces a dummy serial input signal to be received into the sub micro-code decoder 230 based on the detection signal.

In common, as the serial input signal received into the micro-code decoder 220 has a signal width of bits, the number of the dummy bit string generation circuits 11 in the power consumption analysis preventing circuit 200, though not shown, is set equal to the number of bits of the serial input signal like the above-mentioned second embodiment of the present invention.

Since the CPU 300 allows its power consumption analysis preventing circuit 200 comprising the dummy bit string generation circuit 11 so that the micro-code decoder 220 and the sub micro-code decoder 230 are complement to each other in the power consumption, its entire power consumption can exhibit no trace of the action of the micro-code decoder 220. As the result, the action of the CPU can be prevented from being revealed.

Fourth Embodiment

Figure 6:
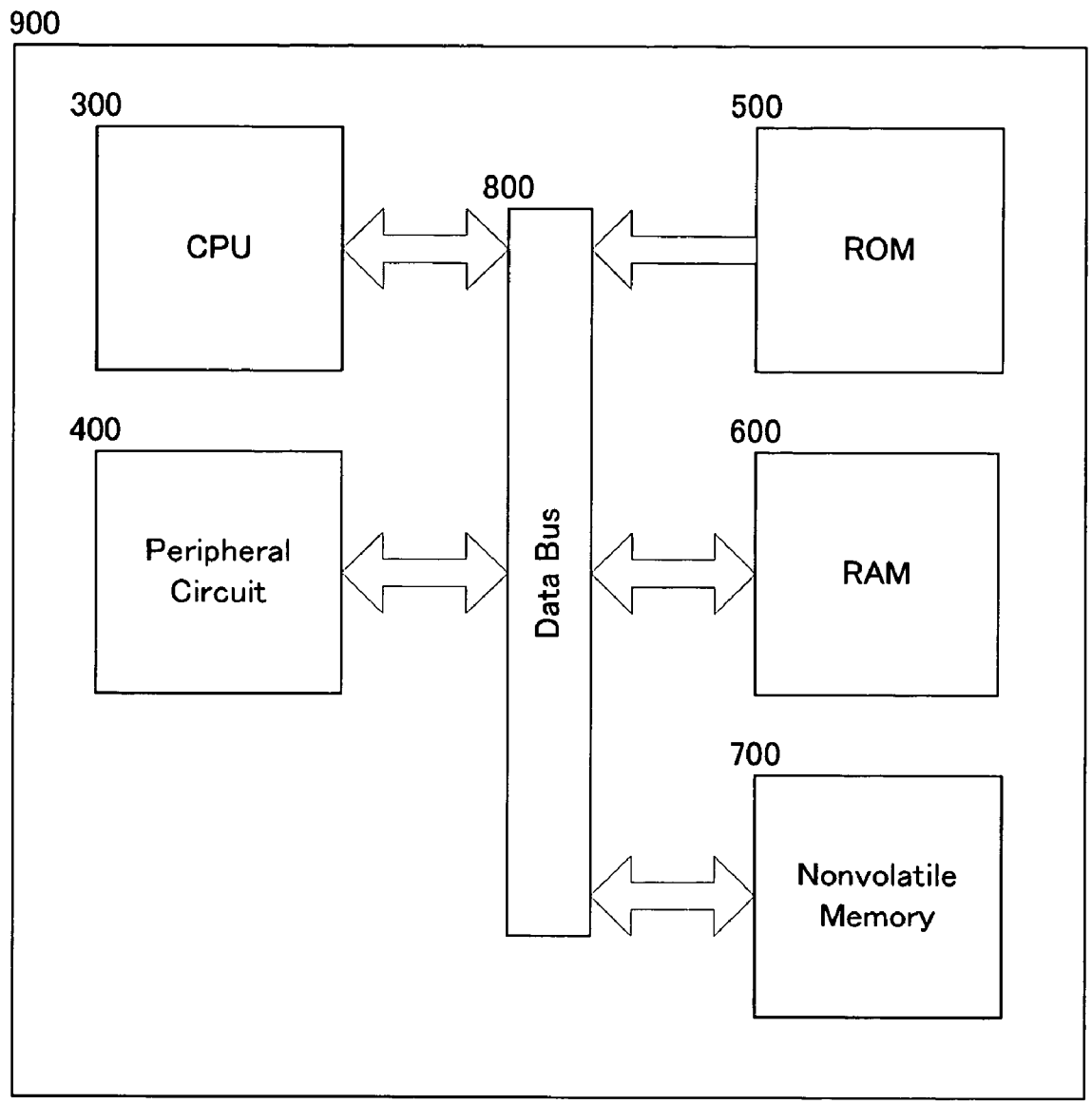
FIG. 6 is a block diagram of a system configuration of an IC card according to a embodiment of the present invention.
Figure 7:
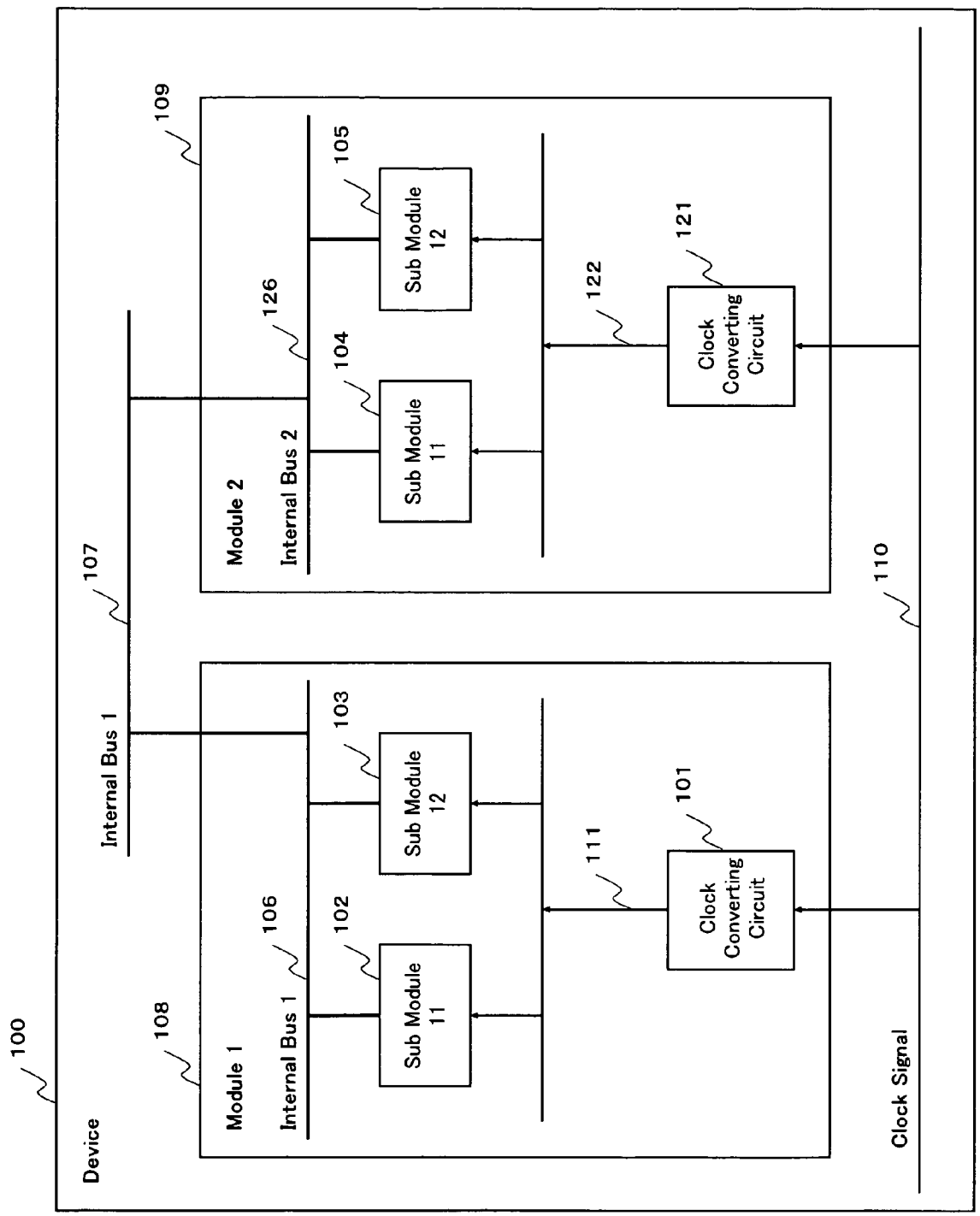
FIG. 7 is a block diagram of a circuit configuration for a protective measure against the power consumption analysis disclosed in Patent Citation 1.

FIG. 6 illustrates a configuration example of IC card which includes the CPU equipped with the power consumption analysis preventing circuit and described as the third embodiment of the present invention.

A IC card 900 comprises the CPU 300 of the third embodiment, a peripheral circuit 400 as a communication circuit with the outside, a ROM 500 for storing the programs, a RAM 600 for temporarily storing the programs and the data, a nonvolatile memory 700 for storing the data, and a data bus 800. The data bus 800 is provided for connecting the CPU 300, the peripheral circuit 400, the ROM 500, the RAM 600, and the nonvolatile memory 700 with one another.

Using the CPU 300 capable of deceiving the power consumption analysis, the IC card can be improved in the security.

INDUSTRIAL APPLICABILITY

The present invention is applicable to a semiconductor device installed in an IC card or the like and expedient for improving the security to protect the internal data from being revealed by the power consumption analysis.

The invention claimed is:

1. A semiconductor device comprising:
a target circuit connected to an input to receive a serial input signal including a bit string;
a sub-target circuit having the same circuit configuration as the target circuit; and
a dummy bit string generation circuit connected to an input to receive exactly the same serial input signal including exactly the same bit string received by the target circuit and arranged to generate a dummy serial input signal including a dummy bit string based on the bit string of the serial input signal received by the target circuit, the dummy bit string generating circuit being connected to the sub-target circuit so as to supply the generated dummy serial input signal including the dummy bit string to the sub-target circuit, wherein
the dummy bit string generation circuit is further arranged to generate the dummy serial input signal including the dummy bit string so that a sum of the number of bit shift times in the serial input signal and the number of bit shift times in the dummy serial input signal remains constant in a series of a plurality of clock cycles, wherein
a plurality of the serial input signals are provided for dispatching to the target circuit in parallel,
the same number of the dummy bit string generation circuits as the number of the serial input signals are provided corresponding to each of the serial input signals, and
each of the dummy bit string generation circuits receives separately the bit string in the corresponding serial input signal and generates a corresponding dummy serial input signal including a corresponding dummy bit string which is received into the sub-target circuit.

2. A semiconductor device comprising:
a target circuit connected to an input to receive a serial input signal including a bit string;

a sub-target circuit having the same circuit configuration as the target circuit; and a dummy bit string generation circuit connected to an input to receive exactly the same serial input signal including exactly the same bit string received by the target circuit and arranged to generate a dummy serial input signal including a dummy bit string based on the bit string of the serial input signal received by the target circuit, the dummy bit string generating circuit being connected to the sub-target circuit so as to supply the generated dummy serial input signal including the dummy bit string to the sub-target circuit, wherein the dummy bit string generation circuit comprises a hamming distance detection circuit for detecting the hamming distance between two consecutive bits of the serial input signal as the first hamming distance, and a conflicting signal generation circuit for generating an input bit which follows the last bit of the bit string of the dummy serial input signal during a detection of the first hamming distance so that a second hamming distance between the input bit and the last bit conflicts with the first hamming distance, wherein a plurality of the serial input signals are provided for dispatching to the target circuit in parallel, the same number of the dummy bit string generation circuits as the number of the serial input signals are provided corresponding to each of the serial input signals, and each of the dummy bit string generation circuits receives separately the bit string in the corresponding serial input signal and generates a corresponding dummy serial input signal including a corresponding dummy bit string which is received into the sub-target circuit.

3. The semiconductor device according to claim 2, wherein the hamming distance detection circuit comprises shift registers and an exclusive OR circuit for detecting bit shift points in the bit string of the serial input signal.

4. The semiconductor device according to claim 2 or 3, wherein the conflicting signal generation circuit inverts the last bit of the bit string of the dummy serial input signal when the first hamming distance is zero, and it does not inverts the last bit when the first hamming distance is one.

5. A central processing unit including an ALU, a register bank, a command fetch circuit, and micro-code decoders, the central processing unit comprising the target circuit, the sub-target circuit, and the dummy bit string generation circuit in the semiconductor device according to any one of claims 1 to 3, wherein the target circuit and the sub-target circuit are the micro-code decoders respectively.

6. An IC card incorporating the central processing unit according to claim 5.

* * * * *